US00RE44751E

(19) United States
(12) Reissued Patent
Riegl

(10) Patent Number: US RE44,751 E
(45) Date of Reissued Patent: Feb. 11, 2014

(54) LASER SCANNER

(75) Inventor: Johannes Riegl, Trabenreith (AT)

(73) Assignee: RIEGL Laser Measurement Systems GmbH, Horn (AT)

(21) Appl. No.: 29/395,692

(22) Filed: Mar. 13, 2012

Related U.S. Patent Documents

Reissue of:
(64) Patent No.: Des. 642,485
Issued: Aug. 2, 2011
Appl. No.: 29/357,833
Filed: Mar. 18, 2010

(30) Foreign Application Priority Data

Sep. 18, 2009 (EM) ..... 001613274-0001
Sep. 18, 2009 (EM) ..... 001613274-0003
Sep. 18, 2009 (EM) ..... 001613274-0005

(51) LOC (10) Cl. ..... 10-04
(52) U.S. Cl.
USPC ..... D10/66; D10/69
(58) Field of Classification Search
USPC ..... D10/66, 69; 340/522; 356/73, 139.04, 356/399, 212.1, 629
See application file for complete search history.

(56) References Cited

U.S. PATENT DOCUMENTS

| | | | | | |
|---|---|---|---|---|---|
| 4,676,598 | A | * | 6/1987 | Markley et al. | 359/212.1 |
| 4,772,875 | A | * | 9/1988 | Maddox et al. | 340/522 |
| 5,144,486 | A | * | 9/1992 | Hart | 359/629 |
| 5,686,996 | A | * | 11/1997 | Fidler et al. | 356/399 |
| D469,369 | S | * | 1/2003 | Durkin | D10/69 |
| D470,424 | S | * | 2/2003 | Hand et al. | D10/69 |
| D504,831 | S | * | 5/2005 | Snider | D10/69 |
| D563,247 | S | * | 3/2008 | Ishii | D10/66 |
| D574,275 | S | * | 8/2008 | Concari | D10/69 |
| D581,819 | S | * | 12/2008 | Banba et al. | D10/66 |
| D609,124 | S | * | 2/2010 | Ishii et al. | D10/66 |
| D635,038 | S | * | 3/2011 | Ishii | D10/66 |

* cited by examiner

*Primary Examiner* — Phillip S Hyder
(74) *Attorney, Agent, or Firm* — Hoffmann & Baron, LLP

(57) CLAIM

The ornamental design for a laser scanner, as shown and described.

DESCRIPTION

FIG. 1 is a perspective view of a first embodiment of a laser scanner constructed in accordance with the invention;
FIG. 2 is a front elevational view of the laser scanner shown in FIG. 1; the rear elevational view being identical to the front elevational view;
FIG. 3 is a side elevational view of the laser scanner shown in FIG. 1;
FIG. 4 is a top view of the laser scanner shown in FIG. 1;
FIG. 5 is a perspective view of a second embodiment of a laser scanner constructed in accordance with the invention;
FIG. 6 is a front elevational view of the laser scanner shown in FIG. 5; the rear elevational view being identical to the front elevational view;
FIG. 7 is a side elevational view of the laser scanner shown in FIG. 5;
FIG. 8 is a top plan view of the laser scanner shown in FIG. 5;
FIG. 9 is a perspective view of a third embodiment of a laser scanner constructed in accordance with the invention;
FIG. 10 is a front elevational view of the laser scanner as shown in FIG. 9; the rear elevational view being identical to the front elevational view;
FIG. 11 is a side elevational view of the laser scanner as shown in FIG. 9; and,
FIG. 12 is a top plan view of the laser scanner shown in FIG. 9.

1 Claim, 12 Drawing Sheets

Figure 1:
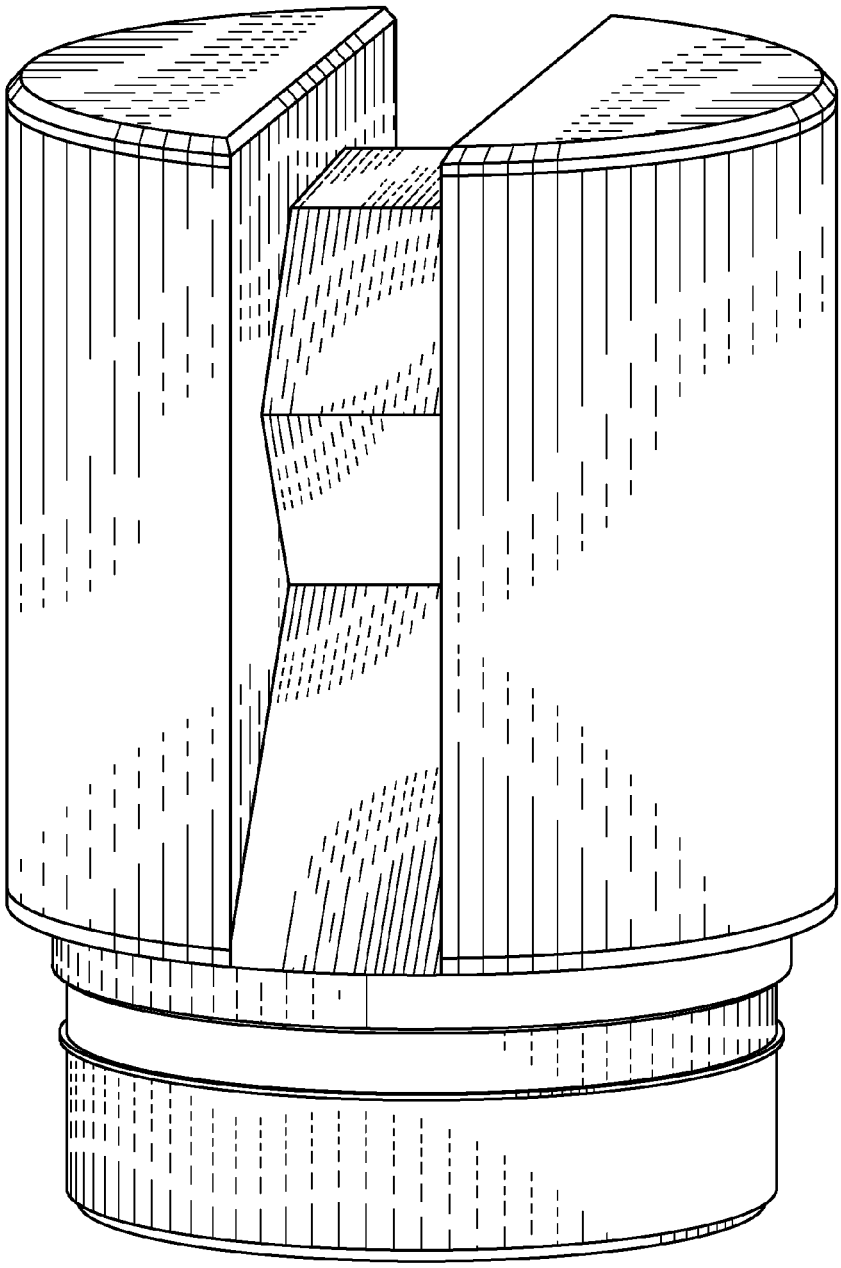
Figure 2:
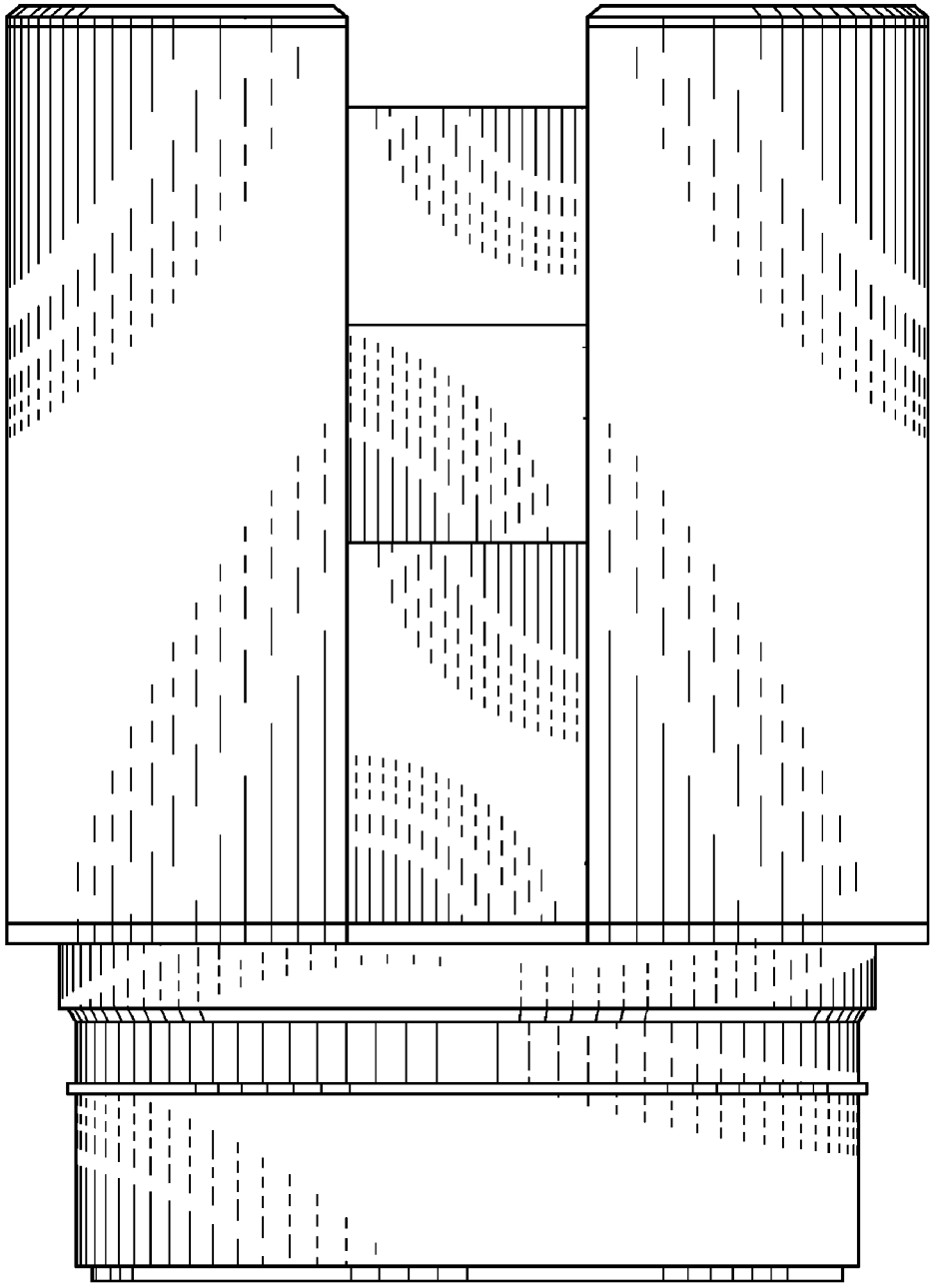
Figure 3:
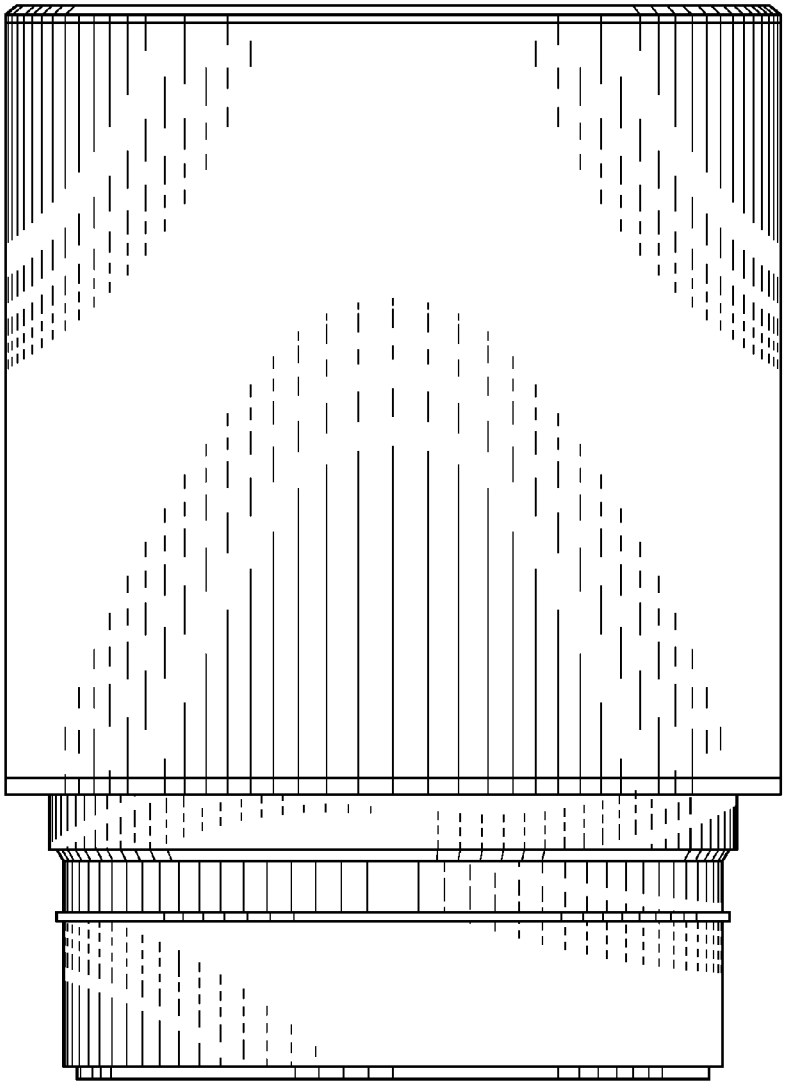
Figure 4:
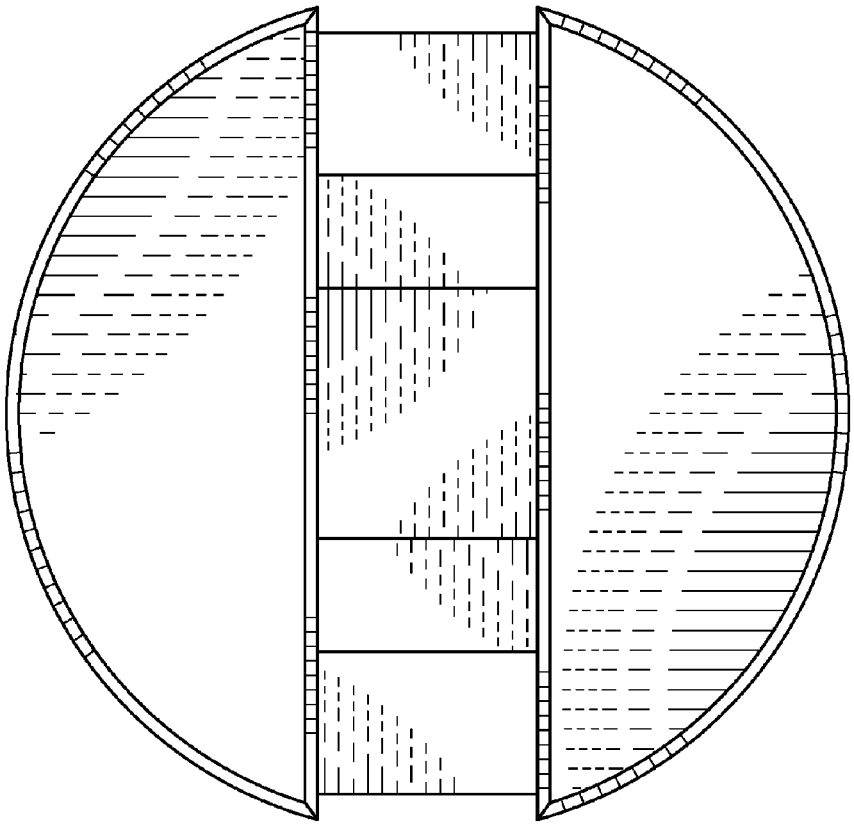
Figure 5:
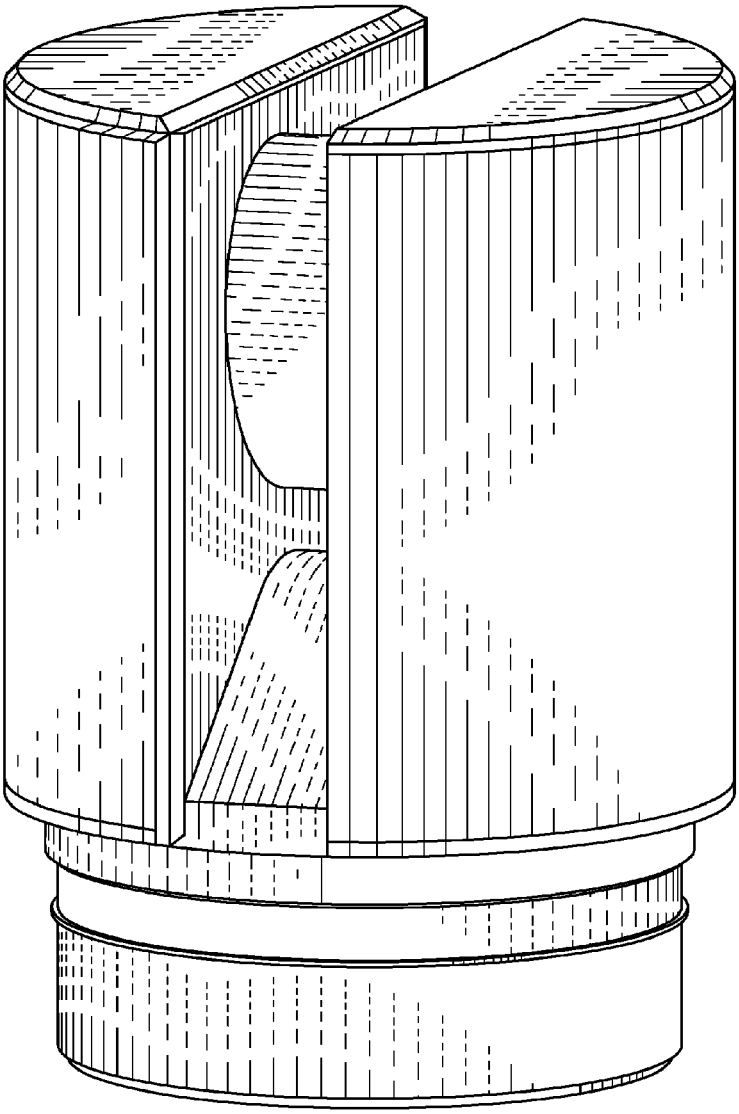
Figure 6:
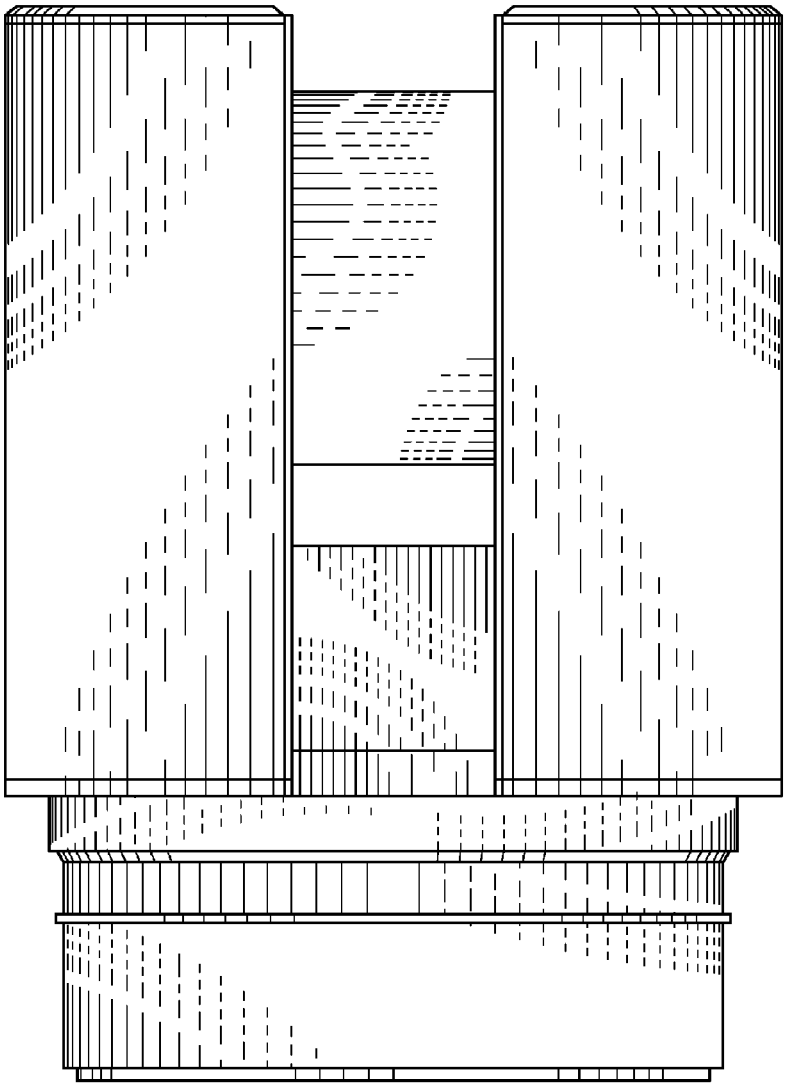
Figure 7:
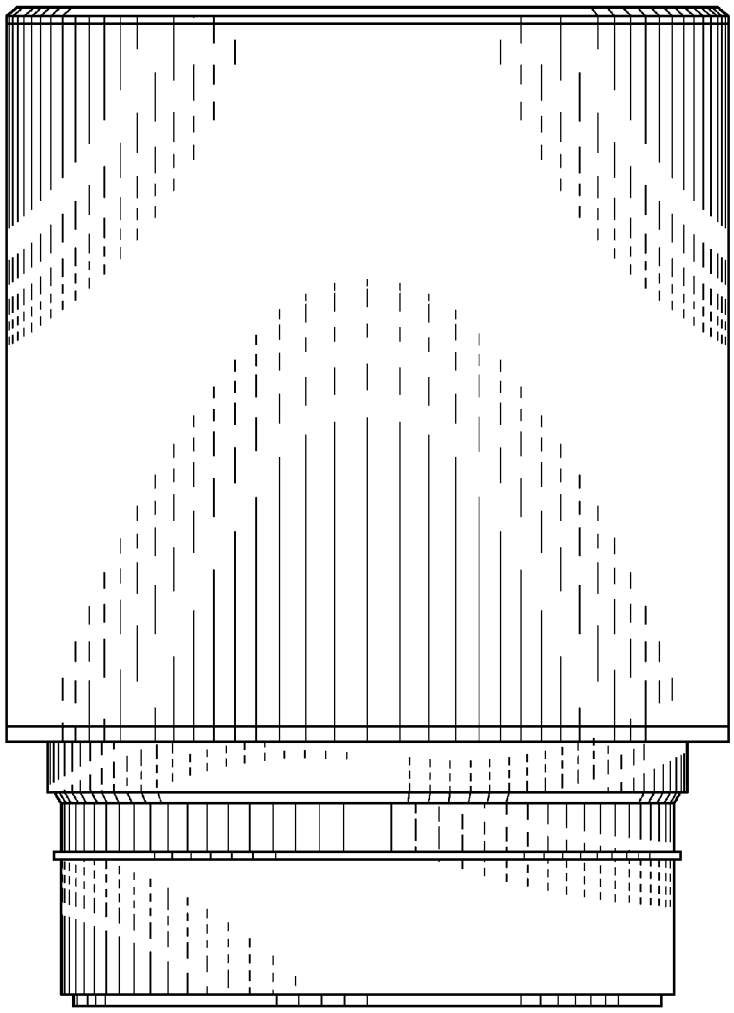
Figure 8:
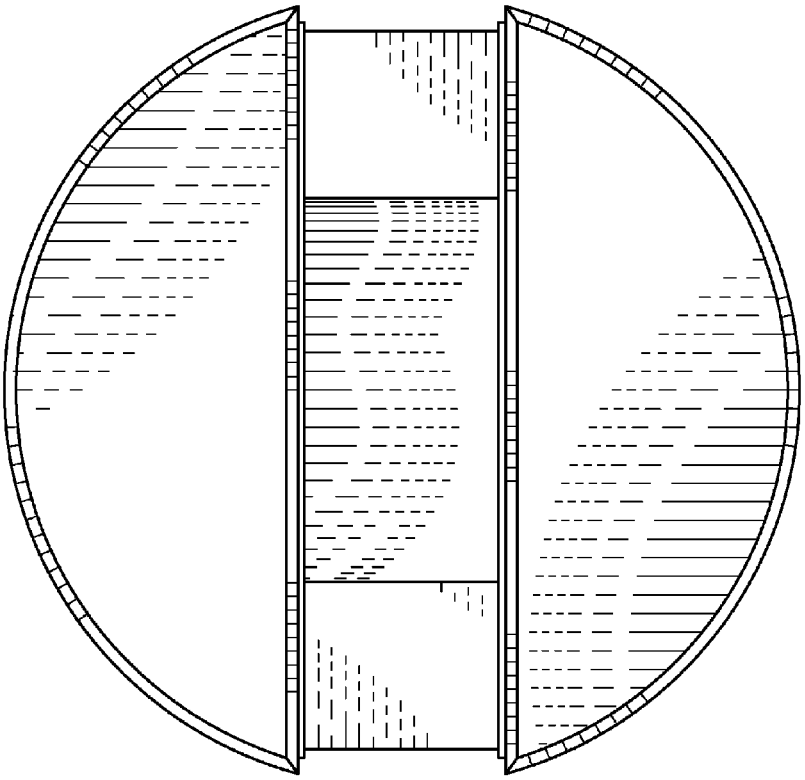
Figure 9:
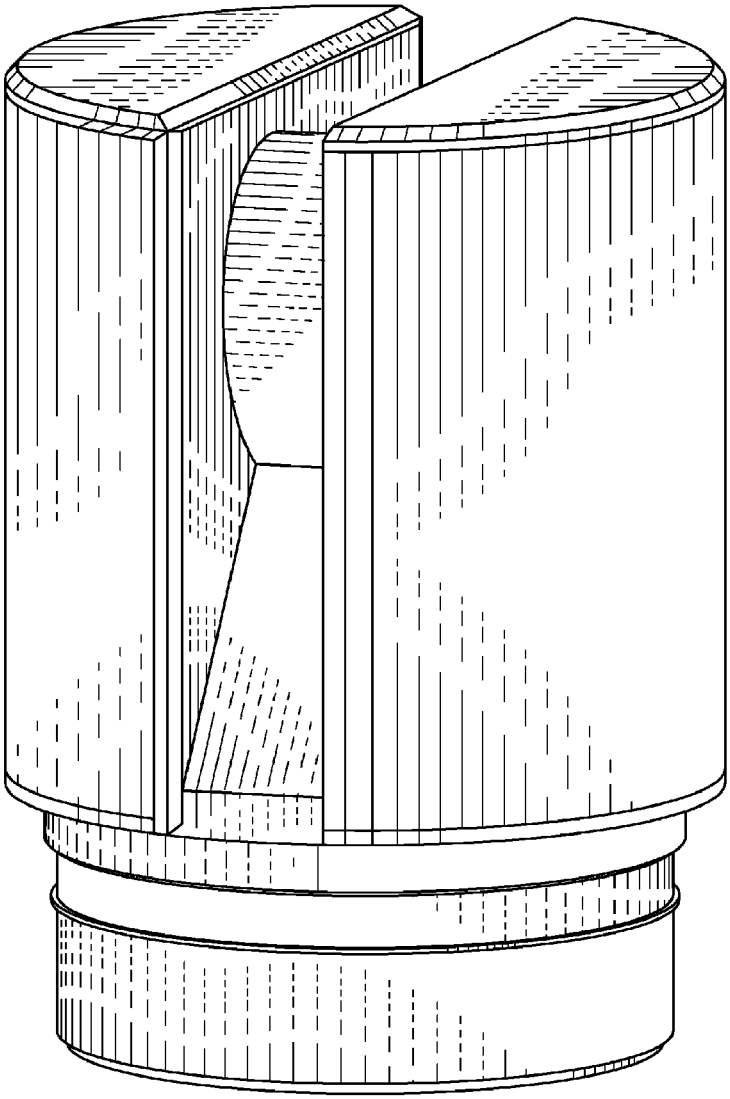
Figure 10:
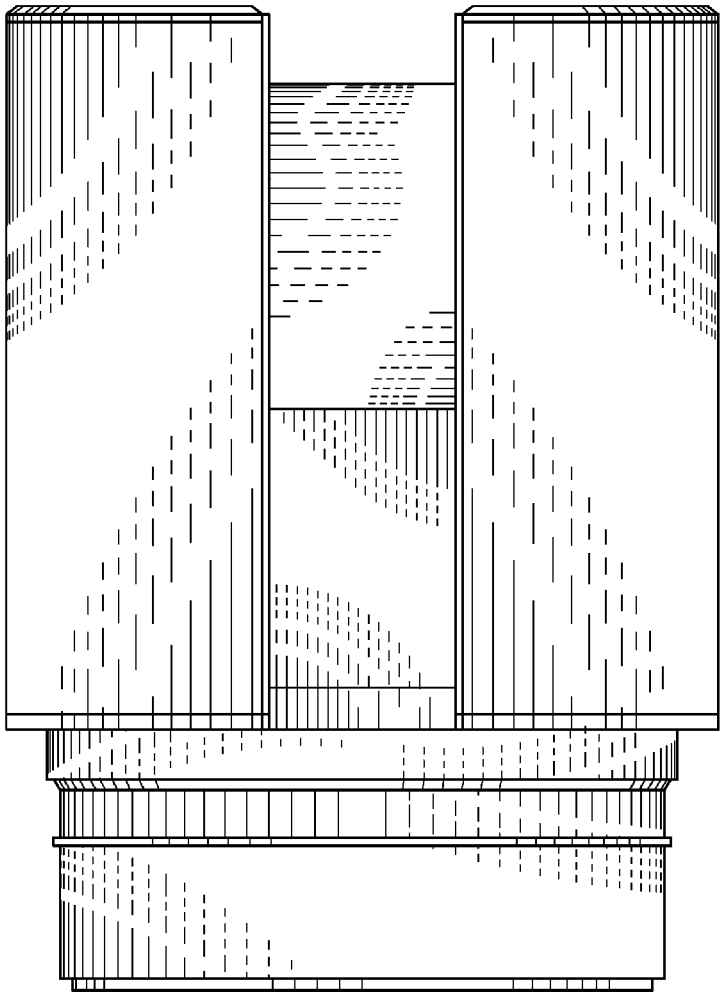
Figure 11:
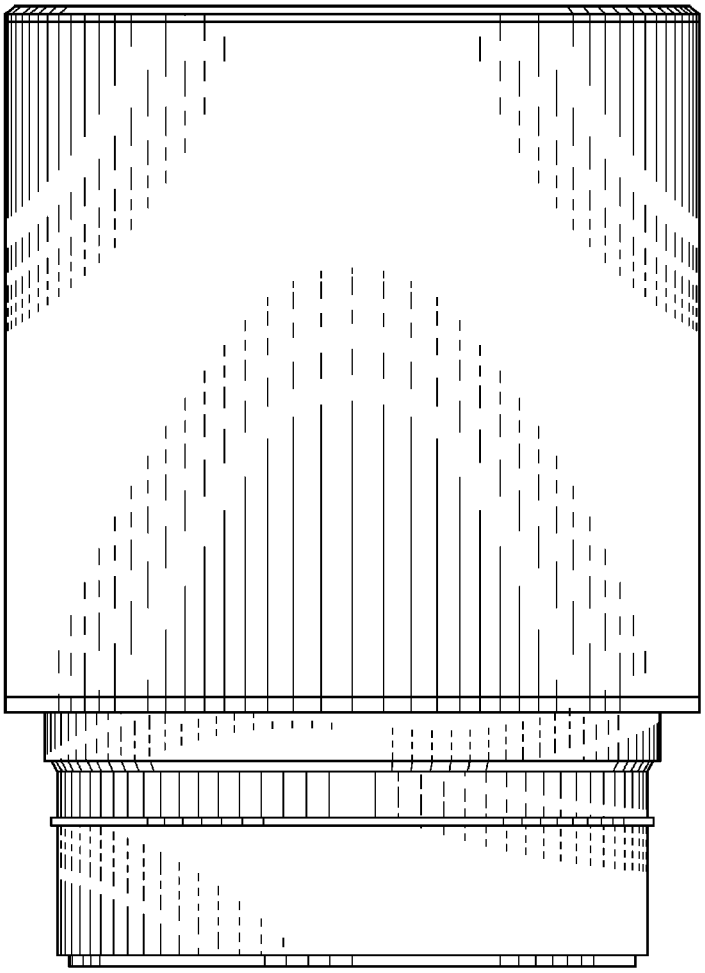
Figure 12:
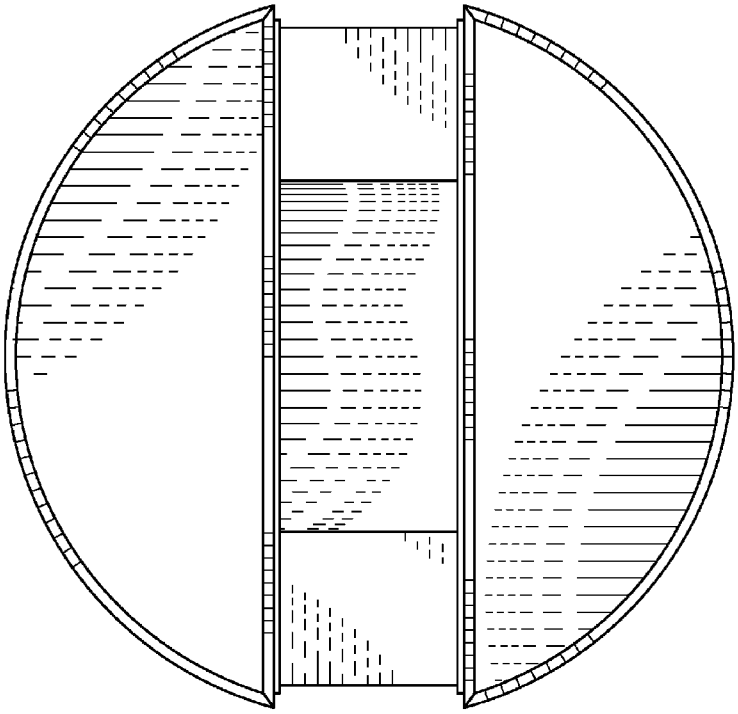

Matter enclosed in heavy brackets [ ] appears in the original patent but forms no part of this reissue; matter printed in italics indicates the additions made by reissue.